S. D. SIMMONS.
ELASTIC FLUID GENERATOR AND MOTOR MECHANISM.
APPLICATION FILED FEB. 16, 1915.
1,149,000.
Patented Aug. 3, 1915.
5 SHEETS—SHEET 5.
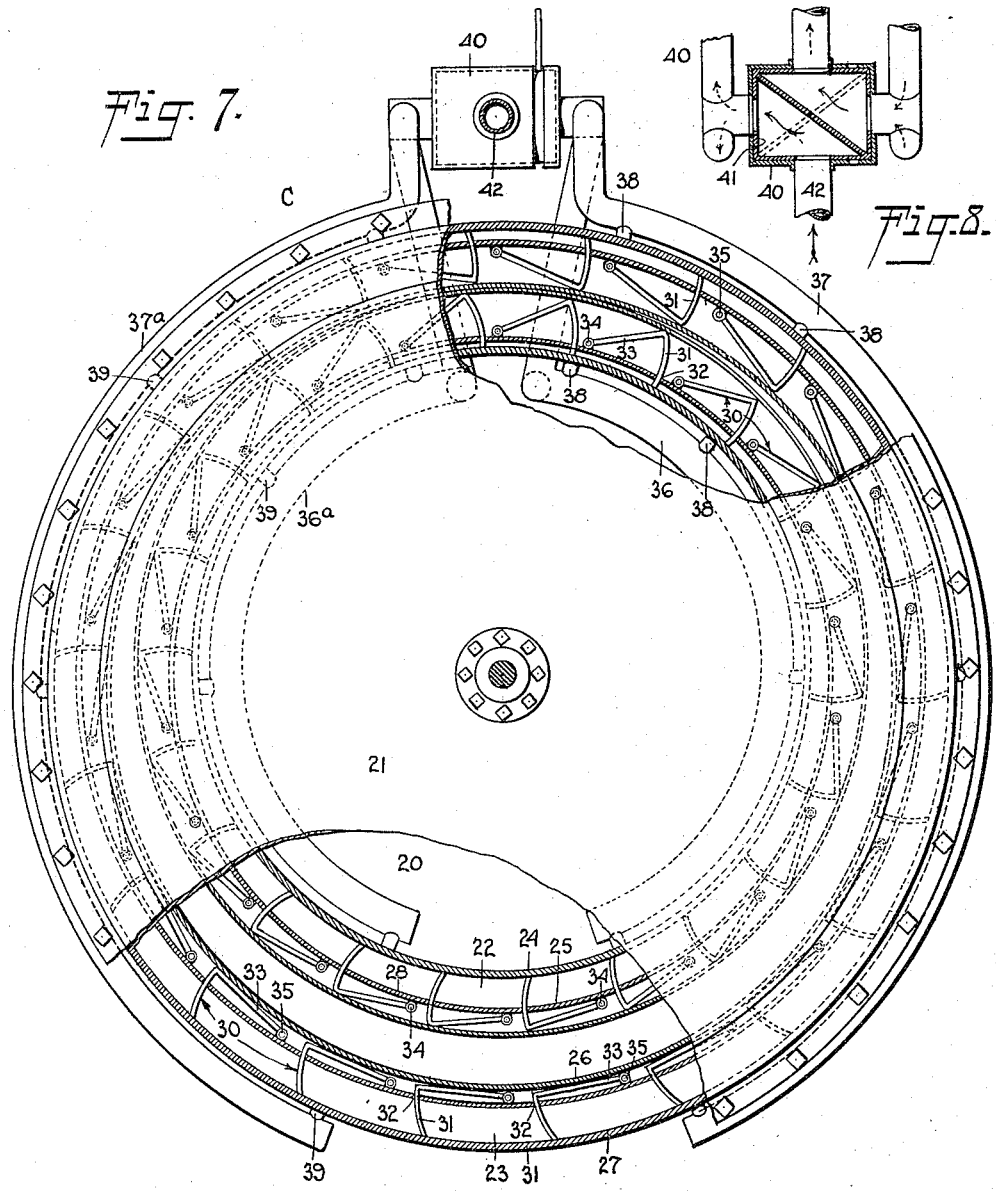
WITNESSES
INVENTOR
Sheridan D. Simmons
BY
ATTORNEYS

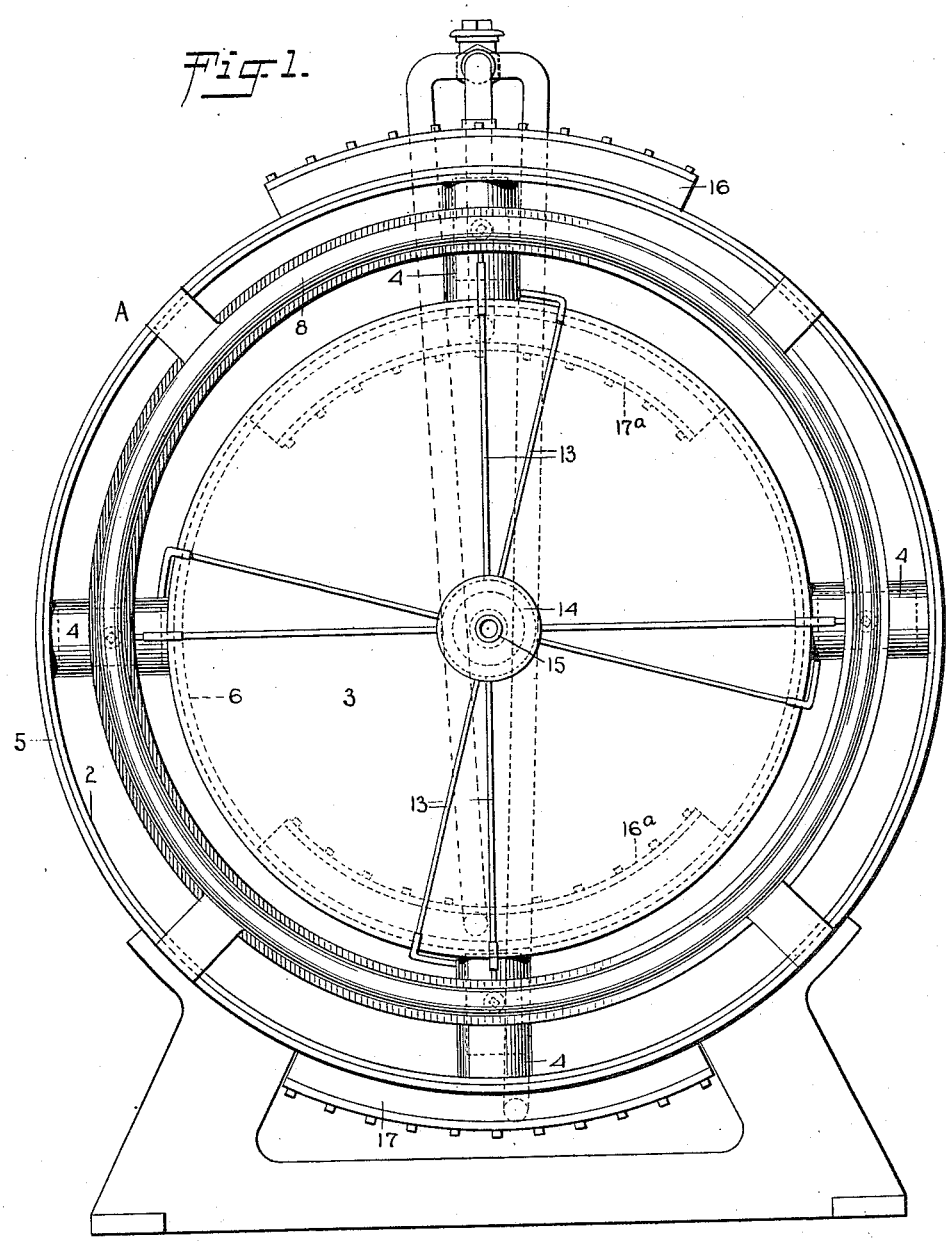

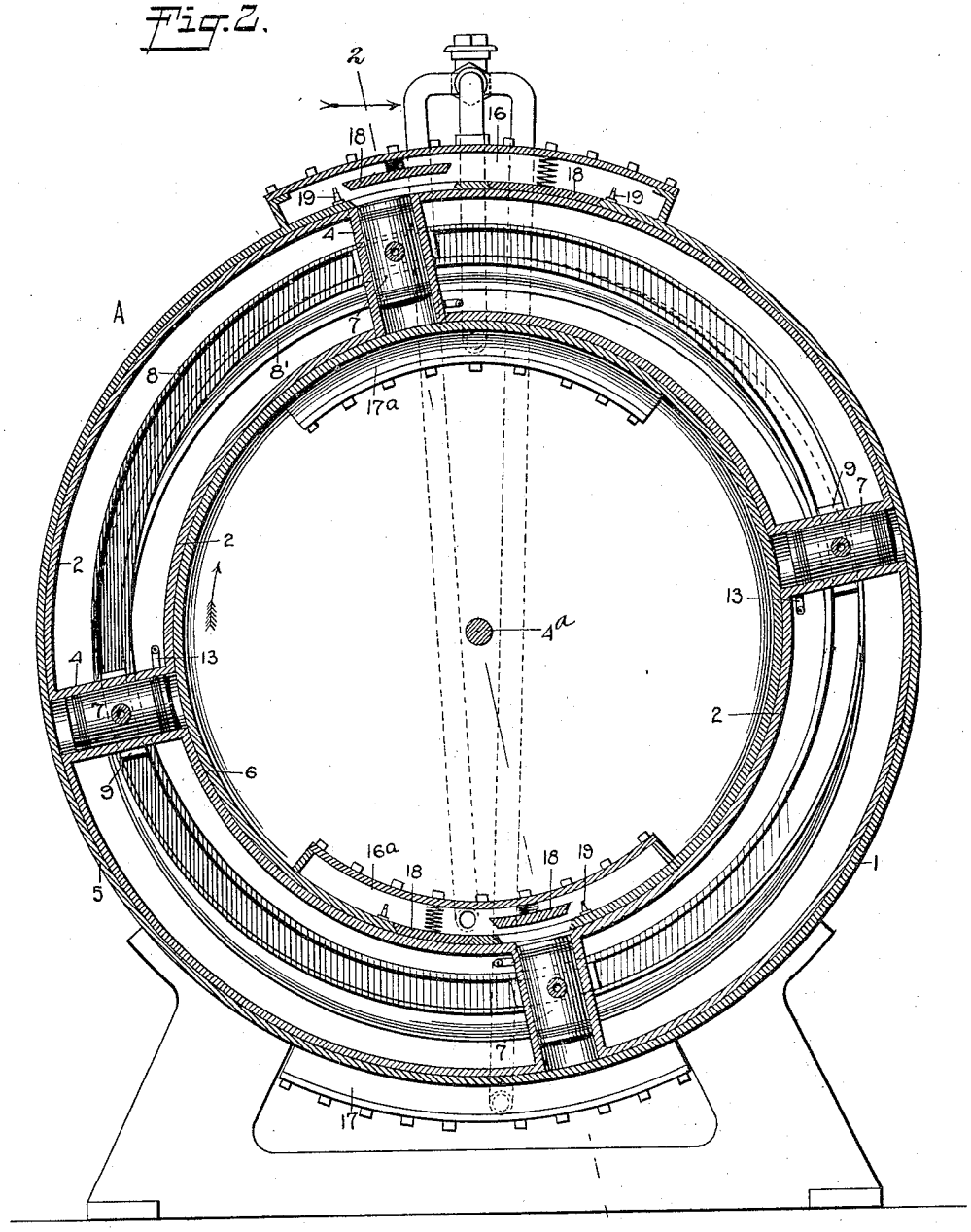

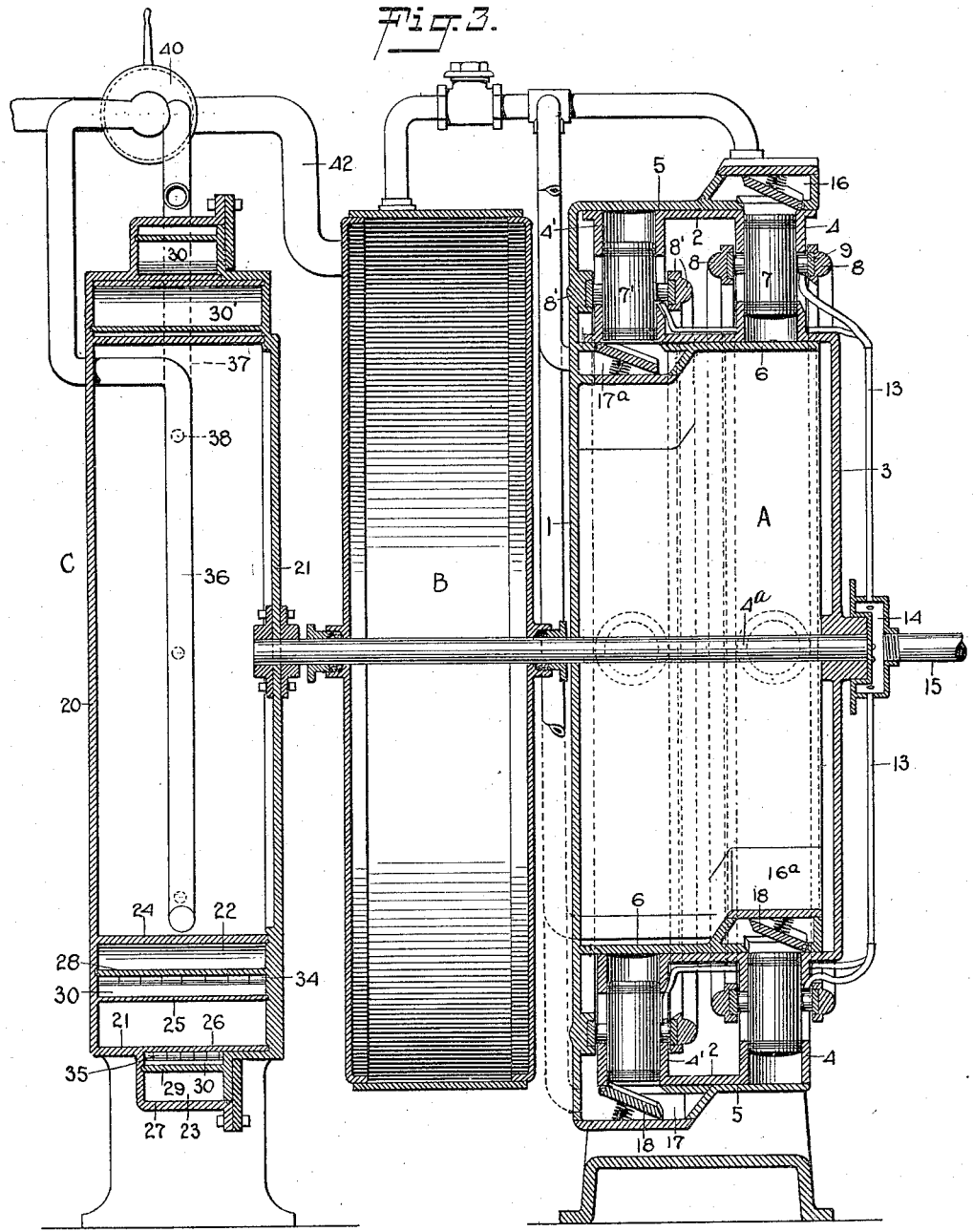

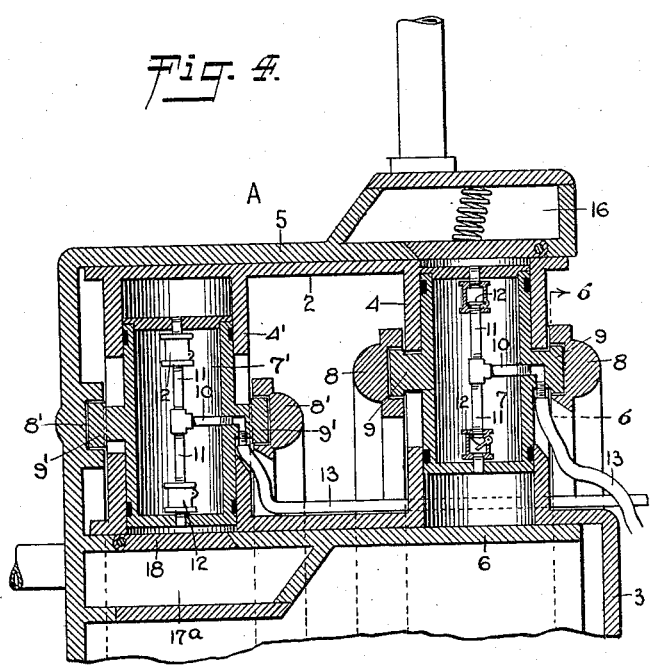
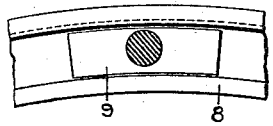
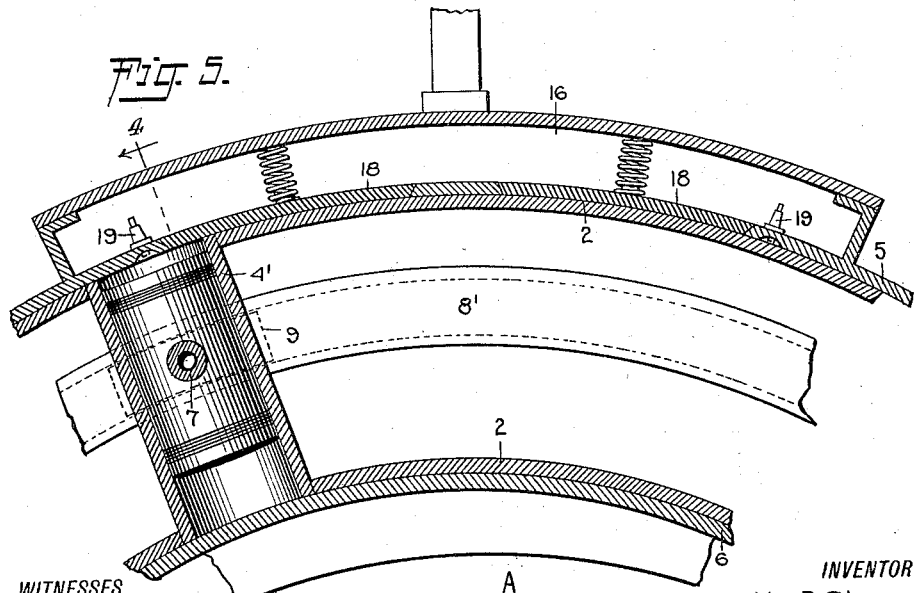

UNITED STATES PATENT OFFICE.

SHERIDAN D. SIMMONS, OF NEW YORK, N. Y., ASSIGNOR OF ONE-HALF TO HENRY AMLING, OF NEW YORK, N. Y.

ELASTIC-FLUID GENERATOR AND MOTOR MECHANISM.

1,149,000.  Specification of Letters Patent.  Patented Aug. 3, 1915.

Application filed February 16, 1915. Serial No. 8,444.

*To all whom it may concern:*

Be it known that I, SHERIDAN D. SIMMONS, a citizen of the United States, and a resident of the city of New York, borough of the Bronx, in the county of the Bronx and State of New York, have invented a new and Improved Elastic-Fluid Generator and Motor Mechanism, of which the following is a full, clear, and exact description.

This invention relates to apparatus for generating elastic fluid from explosive mixtures for the purpose of supplying an elastic fluid turbine or rotary engine, although it is not necessarily limited to this use.

The invention has for its general objects to improve and simplify the construction and operation of elastic fluid generators so as to be comparatively simple and inexpensive to manufacture, reliable and efficient in use and of great capacity compared with the size of the apparatus.

A further object of the invention is the provision of elastic fluid generating means including a multiplicity of pistons and cylinders which draw in and compress the explosive charges, which charges are fired at a time when the cylinders are in communication with a storage chamber, whereby a comparatively uniform pressure is maintained in the latter through the great number of piston and cylinder exploding devices employed.

A further object of the invention is the provision of a novel motor of the elastic fluid type which is capable of efficiently converting the energy of the elastic fluid into mechanical power, and also which is capable of ready reversal.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a side view of a fluid generator; Fig. 2 is a vertical transverse section of one unit of the generator; Fig. 3 is a vertical longitudinal section of the apparatus; Fig. 4 is a detail sectional view on the line 4—4, Fig. 5; Fig. 5 is a fragmentary sectional view of one of the compression devices just reaching the point of ignition; Fig. 6 is a detail sectional view on the line 6—6, Fig. 4; Fig. 7 is a side view, partly in section of the turbine or rotary engine, and Fig. 8 is a sectional view of the controlling valve for the motor.

Referring to the drawing, A designates the elastic fluid generator, B the storage chamber, and C the elastic fluid turbine or rotary engine, which receives fluid from the storage chamber, which latter is supplied by the generator A. The generator A is so designed as to produce elastic or motive fluid from an explosive mixture of air and gasolene or other liquid hydrocarbon.

The generator A comprises a stationary casing 1 in which rotates an annular element 2 which is fastened to a circular plate 3, as shown in Fig. 3, which plate is rigidly secured to a rotating shaft $4^a$. The rotor 2 embodies a plurality of sets of cylinders 4 and 4', there being in the present instance four cylinders to a set, and these are arranged ninety degrees apart and having their axes radial, as shown in Fig. 2. The casing 1 has two concentric annular flanges 5 and 6, between which the rotating element 2 rotates, and these flanges form the heads for the outer and inner ends of the cylinders 4 and 4'. In the cylinders of the said sets are pistons 7 and 7', each piston being of less length than its cylinder, so that there will be explosion chambers at each end of each cylinder. The pistons are reciprocated in any suitable manner, as for instance by sets of circular tracks 8 and 8' for the cylinders 4 and 4', respectively, and on the pistons are arcuate shoes 9 and 9' which run in associated circular tracks, said tracks being eccentric to the center of rotation of the cylinder-carrying rotor 2. With this arrangement it will be obvious that with each rotation of the rotor 2 each piston will make one reciprocation.

Each piston contains a mixture inlet pipe 10 having branches 11 which lead to the ends of the piston, and in each branch is arranged a check valve 12, whereby explosive mixture is admitted during the suction stroke of the piston to the suction end of its cylinder. The pipes 10 of the various pistons connect with one of the shoes thereof, and these shoes are in turn connected by pipes 13 with a distributing chamber 14 at the hub of the plate 3, and this chamber 14 is connected with a supply pipe 15 leading from a mixture producing device. By this arrangement it will be seen that the ends of each cylinder are alternately supplied with an explosive fluid, there being an indrawing of a charge at one end of the cylinder during each half turn of the element 2, while there is a compression of mixture at the opposite end of the same cylinder during the same half revolution.

For each set of cylinders 4 there are explosion chambers 16, 16ª, and explosion chambers 17 and 17ª for the cylinders 4'. The explosion chambers 16 and 17 are externally arranged on the wall 5 and the chambers 16ª and 17ª are internally arranged on the wall 6 of the casing. These chambers are located at diametrically opposite sides of the center of rotation or at the points of maximum eccentricity between the tracks and the cylinder-carrying element, as will be noticed from Fig. 2. Each explosion chamber has a spring-seated valve 18, and when a cylinder reaches such valve and partially overlaps the same, the compressed charge in the cylinder will be ignited by a spark plug or equivalent ignition device 19, the sparking electrodes of which are so disposed as to explode the gas in the cylinder when the latter reaches the spark plug, as will be seen in Fig. 5. The gases exploded in the cylinder now operate on the valve 18 and force the same open, so that the gases thus ignited will burn in the combustion chamber and produce a high pressure therein. As the cylinder passes the valve 18 the latter will close and will remain so until the next cylinder moves into alinement therewith. It is to be noted that each explosion chamber has two sets of valves 18, one being used while the cylinder-carrying element 2 is rotating in one direction, and the other when the said element rotates in the opposite direction. All of these explosion chambers are piped to the storage chamber B, wherein the elastic fluid under high pressure is stored so as to be utilized by the motor C. This motor C drives a shaft 4 which in turn rotates the cylinder-carrying element 2, with the result that the pistons and cylinders will generate the elastic fluid. In the present arrangement eight piston and cylinder units are shown and as each unit is operative at both ends there will be sixteen periods of elastic fluid generation for each revolution of the cylinder-carrying element, and as this element rotates at a high speed there is practically a continuous delivery of elastic fluid from the generator.

The motor or turbine C is shown as consisting of two oppositely disposed stationary and movable walls 20 and 21, the latter of which is rigidly secured to the shaft 4, and between these walls are annular working chambers 22 and 23 concentrically arranged, and each containing a plurality of vanes or abutments against which the elastic fluid operates. The chamber 22 is formed by two circular walls 24 and 25 rigid with the stationary wall or head 20, and the chamber 23 is formed by circular walls 26 and 27 also rigidly connected with the stationary head 20. In the chambers 22 and 23 are circular abutment-carrying walls 28 and 29, respectively, which are rigidly connected with the movable head 21, and these abutment-carrying walls are eccentrically disposed with respect to the walls of the chambers 22 and 23. The abutments, blades or vanes 30 carried by the walls 28 and 29 are L-shaped members, and the blade portions 31 extend through openings 32 in the walls 28 and 29. The base portions 33 of the set of abutments on the chamber 22 are hingedly connected at 34 on the external side of the wall 28, that is to say, on the side away from the center of rotation of the rotor of the motor, and in this case the elastic fluid operates on the vanes, blades or abutments in the space between the walls 24 and 28. The abutments 30 in the chamber 23 are hingedly connected at 35 on the inner side of the wall 29, and the blade portions 31 project outwardly through said walls, so that the fluid acts on the blade portions of the abutments between the walls 27 and 29. Since the blade-carrying walls 28 and 29 are eccentrically disposed in their respective chambers the pockets between adjacent abutments progressively expand during one-half of a revolution, then progressively decrease, the expansion of the pockets taking place during the driving effect of the working fluid, and the decrease taking place during the period of exhaust of the fluid.

One-half of the motor has a pair of pipes 36 and 37 and the other half a pair of pipes 36ª and 37ª, which pipes communicate by nozzles or connections 38 and 39, respectively, with the chambers 22 and 23 at spaced points. One pair of pipes serves to supply motive fluid while the opposite pair serves as outlets for the exhaust fluid, and by a suitable valve either pair of pipes may act as inlets and the other pair as outlets, whereby the motor is rendered reversible. Any kind of valve device may be employed, but as shown in Fig. 8, the valve device comprises a casing 40 in which is a rotatable valve body 41, whereby the supply pipe 42 from the storage chamber B can be connected with the pipes 36 and 37, or 36ª and 37ª, and either set of these pipes will also be connected by the valve with the outlet or exhaust pipe 43.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as are within the scope of the appended claims.

Having thus described my invention, I claim as new and desire to secure by Letters Patent:

1. An elastic fluid generator comprising an annular chamber, an annular member rotatable therein and having a plurality of cylinders formed with open ends closed by the walls of the annular chamber, pistons in the cylinders, stationary tracks with which the pistons engage and exposed eccentrically to the axis of the rotating member, whereby the pistons are reciprocated, and means in the pistons for admitting an explosive fluid alternately to the opposite ends of the cylinders, combustion chambers carried by the walls of the first-mentioned chamber and with which the cylinders are adapted to successively register when the fluid is compressed, valves controlling communication with the combustion chambers, and means for firing the compressed explosive mixture in the cylinders at the time the latter reach the valves.

2. An elastic fluid generator comprising an annular chamber, an annular member rotatable therein and having a plurality of cylinders formed with open ends closed by the walls of the annular chamber, pistons in the cylinders, stationary tracks with which the pistons engage and exposed eccentrically to the axis of the rotating member, whereby the pistons are reciprocated, and means in the pistons for admitting an explosive fluid alternately to the opposite ends of the cylinders, combustion chamber carried by the walls of the first-mentioned chambers and with which the cylinders are adapted to successively register when the fluid is compressed, valves controlling communication with the combustion chambers, means for firing the compressed explosive mixture in the cylinders at the time the latter reach the valves, a storage chamber for receiving the explosive fluid from the combustion chamber, and a motor supplying fluid from the storage chamber, and the rotating element of the motor being connected with the annular cylinder-carrying member.

3. A motive fluid generator comprising a stationary element formed with an annular chamber, a rotating element disposed in the chamber, means carried by the rotating element for drawing in and compressing explosive charges, and combustion chambers for receiving the fired gases from the said means, with a motor receiving motive fluid from the said combustion chambers.

4. An elastic fluid generator comprising a stationary element formed with an annular chamber, a rotating element disposed within the chamber, means for driving the rotating element, radial cylinders in the rotating element and having open ends closed by the walls of the annular chamber, pistons in the cylinders, tracks disposed eccentrically to the center of rotation of the rotatable element and operatively connected with the pistons for reciprocating the same, conduits in the pistons for supplying an explosive mixture to the ends of the cylinders, conduits connected with the pistons and connected with a source of explosive mixture, combustion chambers carried by the walls of the said annular chamber and located at points coincident with the maximum eccentricity of the said tracks to the center of rotation of the rotating element, check valves at the combustion chambers arranged to open when the cylinders reach the same, and means for exploding the compressed charges in the cylinders at the time the latter reach the valves, whereby the valves automatically open and the burning mixture passes into the combustion chambers.

5. An elastic fluid turbine comprising a stationary element having an annular chamber, a rotating element having a circular wall disposed in the chamber in eccentric relation thereto, a plurality of vanes mounted on the circular wall and having blade portions extending therethrough, whereby pockets are formed which successively increase from a given point through one hundred and eighty degrees and successively decrease therefrom to the said given point, means for supplying motive fluid to the pockets of increasing size, and means for exhausting fluid from the pockets of decreasing size.

6. An elastic fluid turbine comprising a stationary element having an annular chamber, a rotating element having a circular wall disposed in the chamber in eccentric relation thereto, a plurality of vanes mounted on the circular wall and having blade portions extending therethrough, whereby pockets are formed which successively increase from a given point through one hundred and eighty degrees and successively decrease therefrom to the said given point, means for supplying motive fluid to the pockets of increasing size, means for exhausting fluid from the pockets of decreasing size, and a valve controlling both of said means, whereby either means can supply the motive fluid while the other means exhausts the motive fluid.

7. A motor of the class described comprising a stationary element having a plurality of annular chambers, a rotating element having a circular wall in each chamber and eccentric thereto, a plurality of swinging blade abutments hingedly mounted on each wall and having blade portions extending through the wall for forming a series of pockets of increasing size in both directions from a given point through one hundred and eighty degrees, and valve-controlled conduits for supplying fluid to the pockets at either side of the said given point for producing rotation in either direction and for exhausting fluid from the pockets at the other side of such given point.

In testimony whereof I have signed my name to this specification in the presence of two subscribing witnesses.

SHERIDAN D. SIMMONS.

Witnesses:
C. BRADWAY,
G. H. EMSLIE.

Copies of this patent may be obtained for five cents each, by addressing the "Commissioner of Patents, Washington, D. C."